(12) United States Patent
Setoguchi

(10) Patent No.: US 6,504,536 B1
(45) Date of Patent: Jan. 7, 2003

(54) SHAPE CREATING/DISPLAYING DEVICE

(76) Inventor: Ryozo Setoguchi, 27-3, Naritahigashi 3-chome, Suginami-ku, Tokyo 166-0015 (JP)

( * ) Notice: Subject to any disclaimer, the term of this patent is extended or adjusted under 35 U.S.C. 154(b) by 0 days.

(21) Appl. No.: 09/367,251
(22) PCT Filed: Feb. 10, 1997
(86) PCT No.: PCT/JP97/00345
§ 371 (c)(1), (2), (4) Date: Aug. 10, 1999
(87) PCT Pub. No.: WO98/35321
PCT Pub. Date: Aug. 13, 1998

(51) Int. Cl.$^7$ .............................................. G06T 15/00
(52) U.S. Cl. ....................................................... 345/420
(58) Field of Search .................................. 345/419, 420, 345/428, 629, 630

(56) References Cited
U.S. PATENT DOCUMENTS 4,775,946 A * 10/1988 Anjyo ......................... 364/522

* cited by examiner

Primary Examiner—Phu K. Nguyen
(74) Attorney, Agent, or Firm—Koda & Androlia

(57) ABSTRACT

The present invention relates to a processing of a 3D shape which is constructed as polyhedron, a curved surface body, a freely forming shape, and a general complex shape body including a compound shape body; by using mainly a basic triangle shape FACET. In this case, a compound and/or complex shape body is constructed by means of direct embedding a curved surface structure in a polyhedron structure as a maternal body. And moreover, this invention relates to a technology of a shape processing for a plane-like image. A plane-like image processing is fundamentally regarded as a display process of a 3D shape. In the case of a 3D shape processing, by this nested embedding structure, the generating and/or displaying process of a target shape is realized as one of the consistent unified processing.

12 Claims, 9 Drawing Sheets

Generating Example of Object
Object: Cleaner (1)

(2)

(3)

Generating Example of Object
Object: Cleaner

*Generating Example of Concave Surface*

*(1) Generating Level 0: Base Plane*

*(2) Generating Level 1*

*(3) Generating Level 2*

Shape Modelling by Winged Edge Type Structure
(Developing Data Structure by Pointer)

(1)

(3) Ridge Pointer (2)

E1 : Left CW Ridge Line
E2 : Target Ridge Line
E3 : Left CC Ridge Line
E5 : Right CC Ridge Line
E6 : Right CW Ridge Line
V2 : Backward Vertex
V3 : Front Vertex
L2 : Right Loop
L5 : Left Loop Coordinate Relation According to PHIGS (IBM)

$O_W$ : Origin of Absolute Coordinate
$O_n$ : Origin of Relative Coordinate
$T_n$ : Distance Between Applied Coordinate
     (Quantity of Moving)

SHAPE CREATING/DISPLAYING DEVICE

TECHNOLOGICAL FIELD

The present invention relates to a target shape generating and/or displaying process. The term "the generating process of a shape" used here means a generating process of a general shape, including a synthesizing and decomposing process of a shape, and moreover an embedding process of a target shape in the world of shapes by means of an integrating activity. The term "the displaying process of a shape" means a displaying process of the results of the above process, for example, the shape generating process. The general shape refers to a 3D and/or 2D shape. The 3D shape contains polyhedrons, curved surface bodies and compound shape bodies thereof, etc.; and the 2D shape contains polygons, curves and compound type shapes thereof, etc.

BACKGROUND ART

FIG. 8 shows a winged edge structure which is well-known and considered to be a supporting technology for shape modeling in the conventional shape forming process. It is clear from this Figure that the winged edge structure carries out the handling process of an applied shape by developing shape state information based on the edge of the target shape, in other words, the ridge of the target shape constructed between vertices of the shape. In the above case, the target shape is fundamentally represented as a polyhedron. Thus, the power of the winged edge structure independently corresponds to the processing of the line state shape, and it also relates to a line-like displaying image.

In the conventional example described above, it is necessary to embed the function which expresses the curved surface when the curved surface is processed. Based on the function which is embedded by pointers, data of the curved surface are created; and the process which develops such data on a basic polyhedron regarded as a maternal body of a target shape is also required. In other words, in the winged edge structure, it is necessary to add an additive mechanism for processing the curved surface to a basic polyhedron structure.

Thus, the conventional winged edge structure is inefficient with respect to a shape processing such as a shape generating and displaying process, because the double interface for both the curved surface body and polyhedron must be set, and there are so many problems that they cannot be done so as to comply with the object, etc. As a result, the efficient construction of the shape database, etc. is made more difficult. In addition, in the dynamic (time-varying) image process, etc., the efficient process cannot be desired, and the dynamic management on the shape processing for the bi-direction game, etc. cannot be almost expected.

The winged edge structure involves another large problem in addition to the problem described above. It is a problem that a direct management of configuration information on assembling information is almost impossible. One of the solutions of the problem is a practical method that was established as a more practical method shown in FIG. 9. In the case of this solution, the movement of the target shape is used as operational information for the shape assembling. Even in this case, a free and efficient shape processing cannot be expected because there is a problem that the degree of freedom of the operation is low for the shape handling process which composes the target shape from the shape part, etc.

The objective of the present invention is to provide an efficient and convenient method that can establish an integrating and unification process of a polyhedron and curved surface bodies and other general shape bodies, thus solving the problems of prior art methods.

DISCLOSURE OF THE INVENTION

The present invention relates to a processing of a plane-like image which is mainly comprised of triangles in the field of a generating and/or displaying process of general shapes including polyhedron, curved surface bodies, and compound and/or complex bodies thereof. Fundamentally, the plane-like image processing means a displaying process of a 3D shape. In the present invention, for example, complex bodies are constructed by directly embedding a curved surface structure in a polyhedron structure; and with this embedding structure, the general shape processing is realized as a consistent and unified process.

More specifically, the general shape is expressed by assembling several parts of shapes, and the whole shape is hierarchically constructed. Each of the parts of shapes is constructed based on the shape forming unit of a triangle. This shape forming unit is called FACET. FACET is a hyperplane cut off as a planar state shape, for example, a triangular shape. The hyperplane as a 3D shape is the plane which bisects the space. In this meaning, the hyperplane in 3D space is a plane constructed by shape composing points and an azimuth vector on this composing point, namely, a plane with a normal line, which is called a tangent plane in the case of a curved surface.

A curved surface on a maternal body is formed as a hierarchical configuration of FACET (a FACET assembly), which is already defined as a shape forming unit. This is an embedding structure or a nesting structure on the maternal body surface, thus constructing an integrating structure for a shape handling process and providing a structuring and organizing function which can realize a unified process.

Geometric information is constructed based upon orienting information (the normal vector and/or tangent vector) on the shape composing point and positioning information (coordinate point) of this composing point.

In this meaning, information of planar state shapes is equal to information of FACET, and then the whole shape is constructed as a hierarchical structure of FACET information. This species of hierarchical structures can be theoretically applied for the unstructuring shape modeling but practically functions efficiently and effectively for the structuring shape modeling. In this case, structured planar state shape information is made up as composing information of FACET of the triangle. In other words, it is isomorphically constructed based on a set of three pieces of geometric information. With this frame, it is possible to construct fully and completely the above species of structures.

Information on an upper side hierarchical structure, namely, a super-structure, should be called assembling information, and a frame-work of a super-structure related to assembling information is systematically built up as the function of composing information that shows a constructive relationship of the hierarchy.

Operational information that functions as assembling information is constituted by a combination of both positioning information (a movement of the coordinate) and information of the azimuth of the relative coordinate (a rotation of the coordinate axis), wherein a movement of the coordinate is related to the center of a shape part, which shows the relationship between the absolute coordinate and the relative coordinate respectively used for the physical world and the display world as the setting coordinate, and a rotation of the coordinate axis is related to the display coordinate of objects. This information serves as management information of the target shape, and moreover performs one role of geometric information, which directly works for the target shape.

Main assembling information is constructed based on connecting information which functions as mutual linkage information of the hierarchical structure. Not only the role of connecting information which shows the unambiguous hierarchical relationship but also the role of freely and efficiently realizing the shape processing are performed. Accordingly, this species of connecting information is called a direct identifier of the hierarchical structure.

As a complementary role of connecting information, an indirect identifier of the hierarchical structure is set up. The indirect identifier of the hierarchical structure mutually and freely regulates the relationship among parts of shapes. By way of using this identifier, the shape processing is efficiently carried out because historical management of parts, etc. can be freely realized.

By means of the modified tetra decimal number system method, that is a modified method of remainder calculation with $4^n$(mod 4) and/or exponential calculation with $4^n$ (the n-th power of 4), the management of the curved surface is realized based on the structuring and organizing function as a type of FACET from a native property. Accordingly, the modeling accuracy of the target shape, etc. can be freely controlled.

As seen from the above, an upper side managing and/or controlling structure, that is defined above as a superstructure, by the systematic hierarchical organization of assembling information and a lower side controlling structure, namely, a last-structure, by the systematic hierarchical organization of geometric information are constructed. By systematically controlling the organized structure related as above, the generating and/or displaying process of polyhedrons, curved surface bodies, various shapes such as complex bodies and the world of shape and image is carried out as an integrating and/or unification process for the shape and image.

BEST MODE FOR CARRYING OUT THE INVENTION

Figure 1:
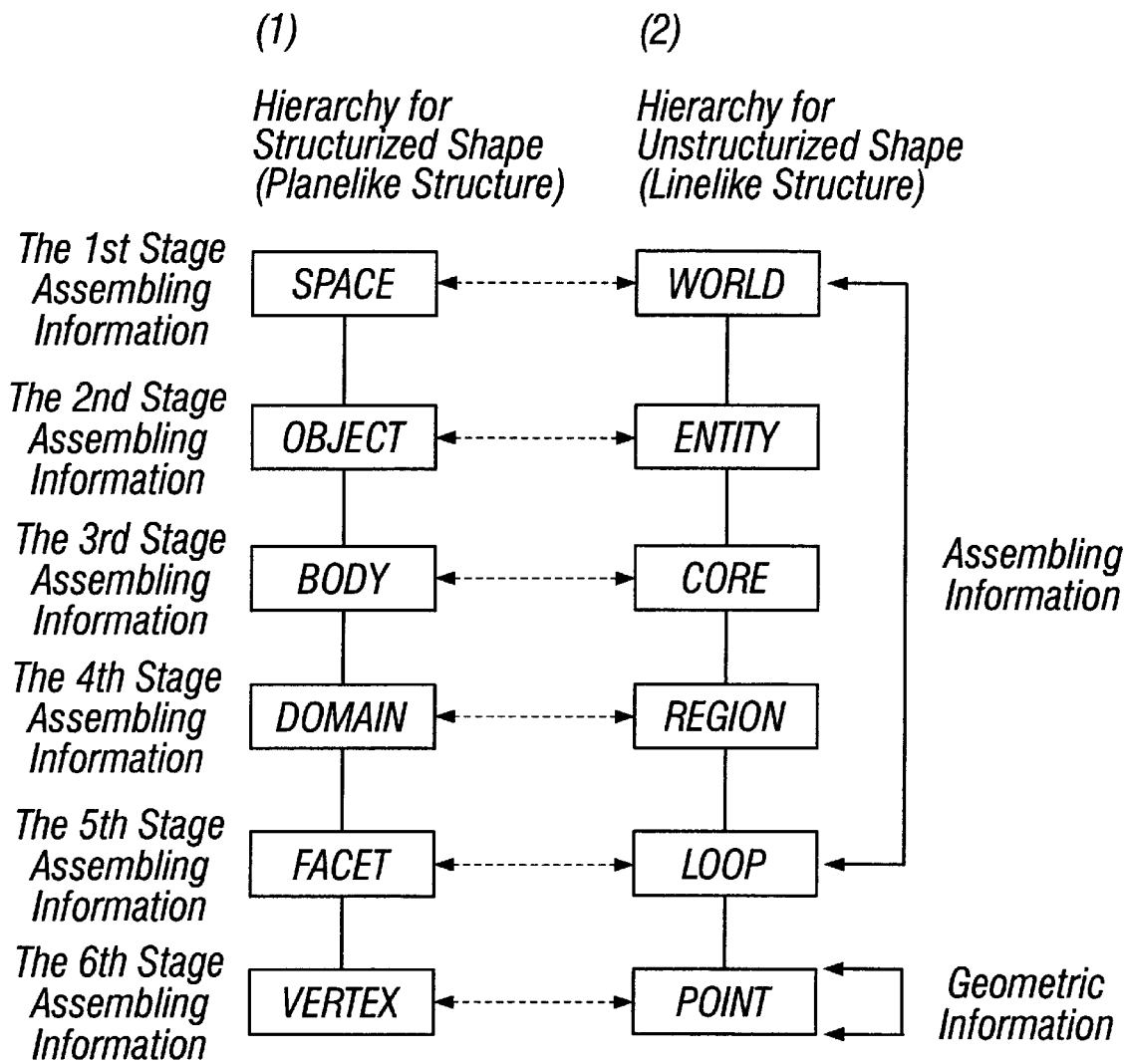
FIG. 1 is a block diagram of the outline of a frame that manages and controls target shapes in accordance with one embodiment of the present invention.

FIG. 1 is an entire configuration schematic diagram in one embodiment of the present invention (which corresponds to claims (1) to (3), especially to claim(1)), relating to a whole configuration which manages and controls the target shape processing.

As a systematic management and control, in other words the central control of the shape processing, the whole consistent control system is fundamentally constructing the hierarchical level of six stages. The related structure of the systematic management and control is constructed according to each of five stages of assembling information and another stage of geometric information. In other words, the present structure is divided into two parts: the superstructure based on management and/or control information of the shape composing process, and the last-structure based on geometric information which retains concrete information for the shape forming process. In geometric information, connecting information for the management and/or control of such a last-structure is explicitly included.

FIG. 1(1) deals with a structuring shape modeling, and FIG. 1(2) deals with an unstructuring shape modeling.

The unstructuring shape modeling mainly refers to a modeling by an opened shape (a cut section of a target shape), and it also means the data of the traditional style shape modeling, which usually comes from the wire frame to solid modeling. The configuration shown in FIG. 1(2) is the supplemental structure constructed naturally considering the compatibility with the structuring shape modeling. Fundamentally, this species of the structure described above corresponds to the line state shape data, and the displaying image is usually created as the line-like displaying image, that is a line-like image.

To the contrary, the structuring shape modeling is a modeling based on the closed shape according to the planar state structure of a triangle, and it is also a modeling style of FACET described above. In other words, it corresponds to data of a plane based type modeling. The displaying image here means the image which is naturally generated by a rendering processing as the so-called 3D shape, etc., that is a plane-like image.

Figure 2:
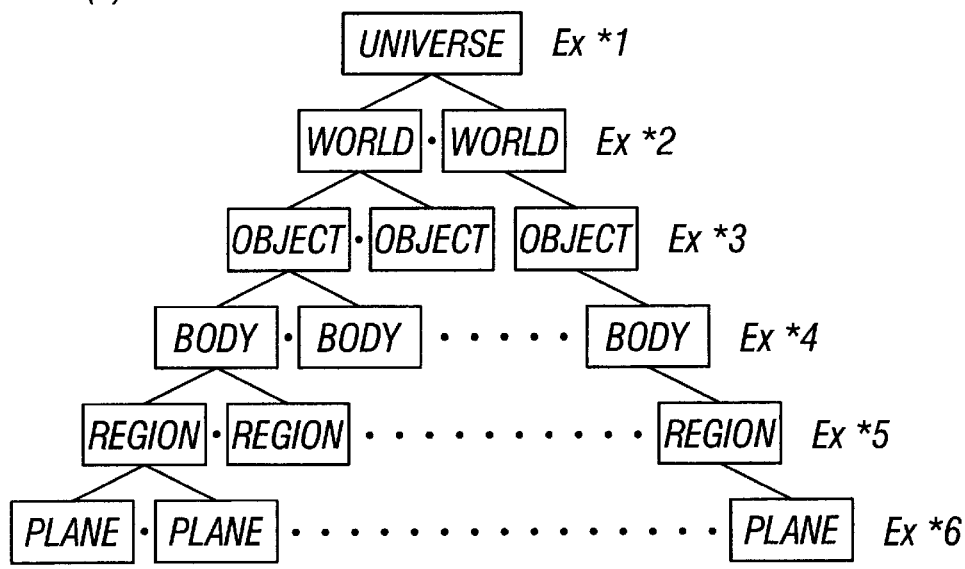
FIG. 2 is one of the examples for the structuring development based on the systematic organization of the above embodiment.
Figure 2:
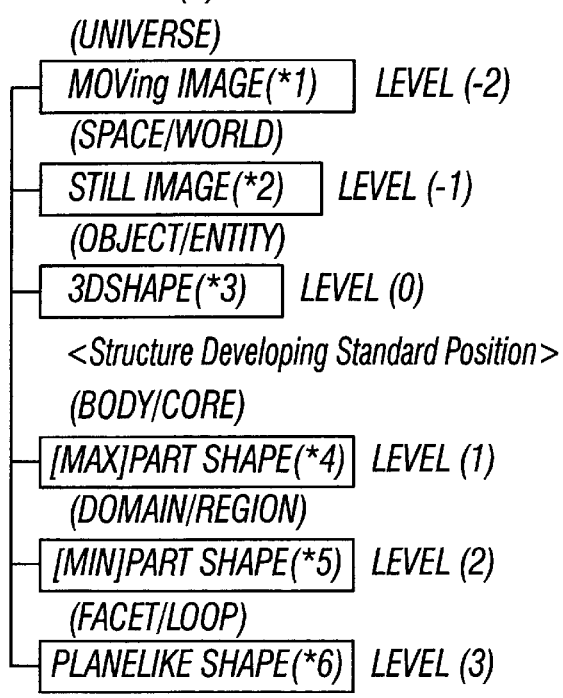
Figure 2:
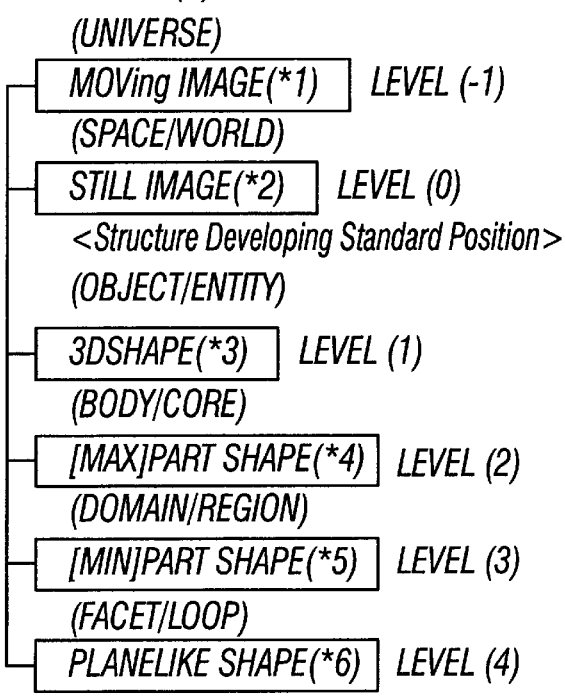

FIG. 2 relates to the concept of "substructure" (which corresponds to claim (1), and also to the content of claims (2) and (3), especially to the content of claim (3) which is "means for dynamically developing and constructing by selectively controlling the basis (node) point developed in the tree-like state structure", etc.

FIG. 2(1) shows the substructure at each level in the nesting structure. Furthermore, each one of FIG. 2(2) and FIG. 2(3) respectively shows the work in the processing of target shapes with OBJECT level and SPACE level. In this case, making each hierarchical level to be 0 means that the composing target shape is respectively corresponding to BODY and OBJECT. More specifically, FIG. 2(2) and FIG. 2(3) show the modes made up as a standard for selecting a hierarchical level in proportion to the processing content and the controlling content. In this meaning, it relates to claim (3).

Here, the objective of the shape processing is made to be one frame of a moving (time varying) image. At first, OBJECT which is the component of a still picture image as one frame of the moving image (including animation) is created.

Naturally, as the bottom up process, the generating of OBJECT begins from the generating of the FACET in the lower layer and then shifts sequentially to serial upper levels of the hierarchical structure, thus carrying out the generating and/or displaying process. This shifting process is realized by recursively composing the parts.

In this process, naturally, the management and/or control is recursively carried out. In other words, connecting information is changed and/or renewed in each stage of this conversion. If OBJECT is composed respectively as a component of the image, the hierarchical level is changed from FIG. 2(2) to FIG. 2(3), and connecting information is renewed. In this case, the created OBJECT becomes parts which means a still picture image at the SPACE level.

On carrying out the above changing process, each OBJECT is moved/rotated, and a given configuration is embodied. This process is retained as operational information. At the same time, connecting information is given to the indirect hierarchical identifier, and then the historical control and/or the precision control of parts, etc. are carried out. By this process, connecting information of the hierarchical structure is controlled, and the dynamic structure is automatically constructed.

Figure 3:
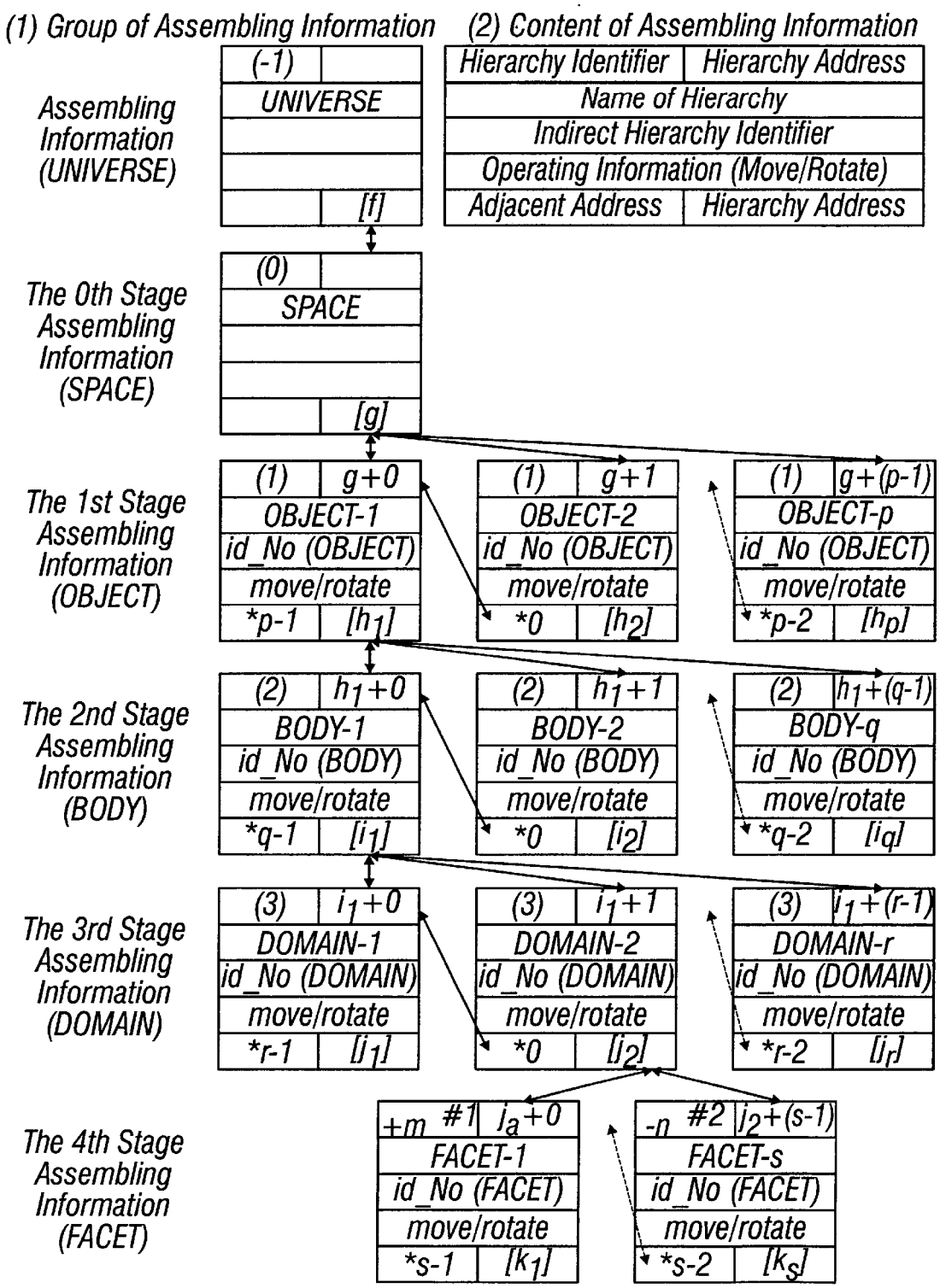
FIG. 3 shows a concrete example of contents related to assembling information in the above embodiment that sets up the hierarchical construction based on assembling information of a super-structure and a linked state related with these kind of assembling information, wherein symbol + of term #1 means the convex surface, and symbol of term #2 means the concave surface, and the symbol * is used as an address indicator.

The above schema with the aid which realizes the automatic construction of this species of the dynamic structure is shown in FIG. 3. FIG. 3 shows the constructing mode of the upper side hierarchical structure (which corresponds to claims (2), (3) and (4), especially to claims (2) and (3)), what is called a super-structure, as an example.

FIG. 3(1) shows an embodiment of the management and control in the upper side hierarchical structure. In this case, by referring to the content of FIG. 3(2), the details of the executing content becomes clear.

FIG. 3(2) shows one of the typical examples on assembling information constructed as a basic shape forming set, in other words, a basic shape forming structure or a fundamental unit structure that is an element of a hierarchical type shape structure, used in the construction of the upper side hierarchical structure.

By repeatedly using a basic shape forming set, the upper side hierarchical structure is constructed as the assembling information group, that is a group of 1st table. In other words, part of target shape is generated and/or displayed by means of recursively constructing a basic shape forming set.

The basic shape forming set shown in FIG. 3(2) contains coordinate information which describes parts of a target shape as operational information. This coordinate information is respectively constituted as arranging information on parts of a target shape by the relative movement and rotation of parts of the target shape. As for connecting information, it is set up such as following information; left and right adjacent information, which clarify the structuring relationship of the right and left of the hierarchical structure, and upward and downward information, which clarify the structuring relationship of the top and bottom of the hierarchical structure.

It is the direct hierarchical identifier that retains the structure according to such connecting information and carries out the management and control on the target shape. Fundamentally, the direct hierarchical identifier is made up as an artificial structure which functions with a pointer, etc. that indicates the position of target information.

Furthermore, in this case, a mutual linkage configuration factor which functions as a hierarchical structure identifier is artificially constituted as one that has function equal to the direct hierarchical identifier. As described above, the required configuration of the hierarchy is clarified; and such information as the hierarchical level, depth of the hierarchical structure or attributions of the shape part, etc., for example, are recorded, and they are used as information of the direct management and/or control.

In addition, an indirect identifier which can carry out the historical management such as the management of shape parts for one of connecting information is prepared. By setting up this species of identifier, a simple, clarified and direct management and control of the hierarchical structure can be possible as a style which exceeds a linkage position of the whole structure for the original systematic control with the hierarchical structurization (which corresponds to claim (4)). For instance, the position of FACET which constructs DOMAIN can be freely and easily facilitated as shape parts. Moreover, not only a mutual linkage as shape parts but also an arrangement relationship between shape parts which is constructed by shape parts can be also specified.

Namely, this process of generating and/or displaying the target shape can be done by controlling the historical record of whichever shape part makes up the assembly of shape parts, when the part shape which makes up the target shape is formed.

For example, when the shape part of the target shape is to be corrected and manipulated, the correction of the shape part can be executed immediately in a specified shape region, because the shape part can be specified based on historical information given in the indirect identifier by operating the mouse on the screen. Thus, an effective and efficient image processing can be realized.

Figure 4:
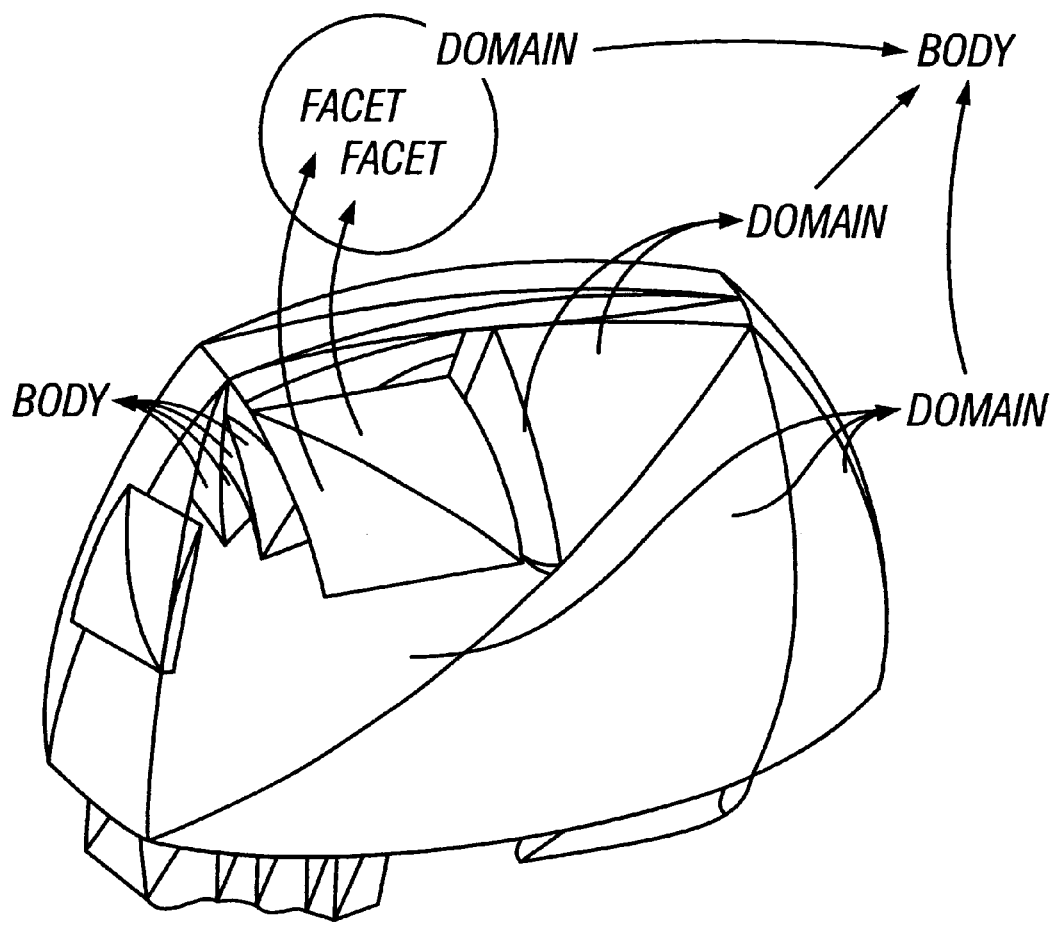
FIG. 4 shows an example of actual assembling information in the above embodiment.

FIG. 4 shows an embodiment of a configuration on a built-up structure of a cleaner which is one of the electronic products marketed; and it is shown that the configuration of this shape is generated and/or displayed as a hierarchical structure of FACET, DOMAIN, and BODY.

Figure 5:
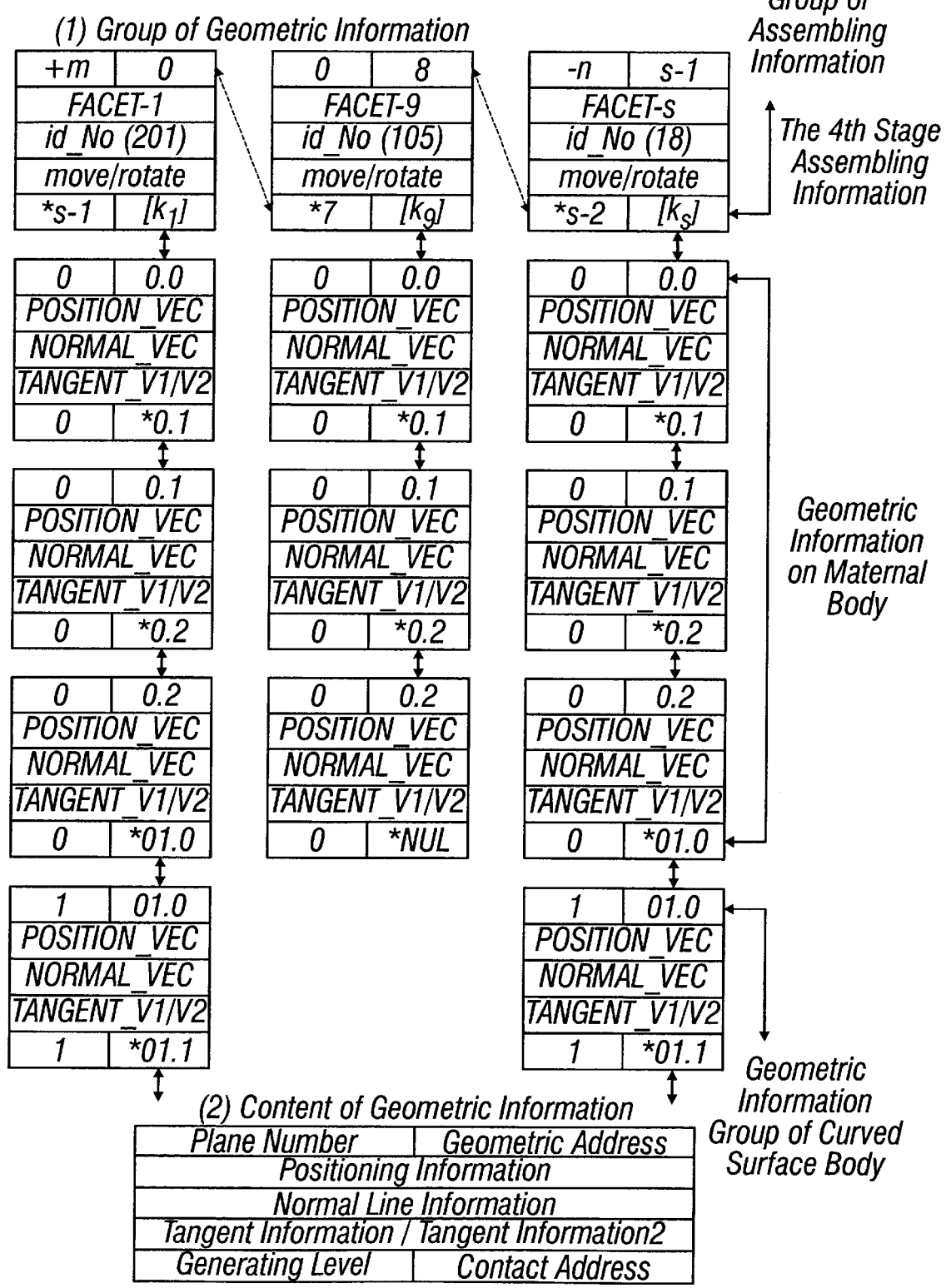
FIG. 5 shows a concrete example of contents related to geometric information in the above embodiment that sets up the hierarchical construction based on geometric information of a last-structure and the linked state related with these kind of geometric information, wherein the symbol * is used as an address indicator as in FIG. 3.

FIG. 5 typically shows a supporting means which realizes the automatic construction on the dynamic structure of geometric information as the lower side hierarchical structure, what is called a last-structure (which corresponds to claim (5)), and it shows the constructing mode of the lower side hierarchical structure for a related example.

FIG. 5(1) shows an embodiment of the management and control in the lower side hierarchical structure. The details of this executing content can be clarified by referring to the content of FIG. 5(2).

FIG. 5(2) shows one of the typical examples on geometric information constructed as a basic shape forming set, that is defined as a fundamental unit structure in a hierarchical shape structure, used in the construction of the lower side hierarchical structure.

By repeatedly using the basic shape forming set, as the similar way of constructing the upper side hierarchical structure, the lower side hierarchical structure is constructed in a style which constitutes the geometric information group, that is a group of 2nd table. In other words, a curved surface as a part of the target shape is generated and/or displayed by recursively constructing a basic shape forming set on geometric information.

This basic shape forming set shown in FIG. 5(2) is constructed, as shape composing information, based upon information with the coordinate which describes the planar state shape. Composing information of the planar state shape contains a normal vector (normal) of the hyperplane, that is equivalent to the tangent vector. Namely, composing information has both orientating information (azimuth) and vertex information (position) of FACET as geometric information of the polygon which respectively constructs the polyhedron.

FACET which constructs the target shape may determine connecting information of FACET by way of considering respectively and independently working conditions. With this independence of FACET, the lower side hierarchical structure becomes the direct handling structure, unlike the upper hierarchical structure, thus carrying out an effective and efficient management and/or control.

Then, the management and control of information in both the top and bottom of the hierarchical structure are given as connecting information.

As for connecting information in the lower side hierarchical structure, what is called a last-structure, upside connecting information is called a geometric informative address, and downside connecting information is simply called a contact address. Thus, geometric information can be constructed in a linkage state as a simple and explicit connecting relationship. Therefore, connecting information can be indirectly managed and/or controlled as well as the upper side hierarchical structure. The plane number should play this role.

A fundamental and geometric information group which relates to the structured planar state shape of FACET is constructed by three sets of the above-described basic shape forming set. The shape of a curved surface body is expressed by recursively constructing such a fundamental and geometric information group, and the frequency of the repetition is equivalent to the generating level of the curved surface and means the depth of the lower side hierarchical structure. That is to say, the management and control of the target shape is carried out following as the plane number, and it is therefore meant that the generating and/or displaying process of the target shape is effectively and efficiently executed.

One of the serial type artificial structures is the alignment structure developed as a chain-like developing hierarchical structure, in other words, a chain-like state structure. Another type of the artificial structure is a tree-like developing hierarchical structure, in other words, a tree-like state structure, which can be recursively constructed as a substructure with a basic shape forming set shown in FIG. 5(2).

Namely, in the above sense, a chain-like state structure and a tree-like state structure can be freely developed as a commutative structure. This commutative structure guarantees the flexibility and high-speed process of the shape processing.

The above function is described as a modified tetra decimal number system calculating operation method based on the structuring and organizing work (which correspond to claim (6)), that is the modified calculating operation method of a tetra decimal number system, in which both the remainder calculation and exponential calculation can be realized by nature. Thus, the modeling accuracy of the shape, etc. can be controlled.

Namely, this modified tetra decimal number system calculating operation method is executed as a reversible process. More specifically, as an operation of the commutative structure, the chain-like developing factor J which forms the serial structure, that is a kind of the chain-like state structure, and the tree-like developing factor $(a_n, a_{n-1}, \ldots, a_2, a_1, a_0)$ which forms the tree-like state structure are calculated as follows: that is to say, under the condition that the chain-like developing factor J is given, the tree-like developing factor $(a_n, a_{n-1}, \ldots, a_2, a_1, a_0)$ is:

$$J \text{ div\_mod } (4^n) = (a_n, a_{n-1}, \ldots, a_2, a_1, a_0)$$

wherein, div\_mod is the synthesis operator of the division operator (div) and remainder operator (mod). This div\_mod operator is the operator which simultaneously determines the quotient and remainder. In this calculation (the above converting operation), the remainder becomes an operand of the next stage in said operation which gives the asked quotient to the coefficient worked as the tree-like developing factor.

As the final calculation n=0, a final result of calculation becomes $(4^0)$, namely the quotient for (1). Therefore, the remainder in the operation of the front stage becomes a quotient as it is, and it becomes a value of the last coefficient.

The chain-like developing factor J is carried out here as the operational example for the optionally selective value 187, namely, J=187. The constructive coefficient equivalent to the tree-like developing factor is determined based on following operations.

Namely, $$
\begin{aligned}
256\,(4^4)\,\,)\,\,&\underline{\phantom{xx}187\phantom{xx}}\,\,(0) ---(a^4)\\
&\,\,\underline{0}\\
64\,(4^3)\,\,)\,\,&\underline{\phantom{xx}187\phantom{xx}}\,\,(2) ---(a^3)\\
&\,\,\underline{128}\\
16\,(4^2)\,\,)\,\,&\underline{\phantom{xx}59\phantom{xx}}\,\,(3) ---(a^2)\\
&\,\,\underline{48}\\
4\,(4^1)\,\,)\,\,&\underline{\phantom{xx}11\phantom{xx}}\,\,(2) ---(a^1)\\
&\,\,\underline{8}\\
1\,(4^0)\,\,)\,\,&\underline{\phantom{xx}3\phantom{xx}}\,\,(3) ---(a^0)\\
&----> (0, 2, 3, 2, 3).
\end{aligned}
$$

Accordingly, as a result of this converting operation, the tree-like developing factor becomes (0, 2, 3, 2, 3) when the chain-like developing factor J is 187. Thus, this FACET with the serial number 187 (the 187th generating order), that is the 187th generating surface, is made up as having the 4th generating level, that is n=4; and in the generating process of FACET at the 1st stage, it is shown to correspond to FACET which is generated at the 2nd sequence. In the generating process of FACET at the 2nd stage, it is shown to correspond to FACET generated at the 3rd sequence in the FACET at the 2nd sequence of the 1 st stage. Then, in the generating process of FACET at the 3rd stage, it is shown to correspond to FACET generated at the 2nd sequence in FACET of the 3rd sequence at the 2nd stage. Moreover, in the generating process of FACET at the 4th stage, it is shown to correspond to FACET generated at the 3rd sequence in FACET of the 2nd sequence at the 3rd stage.

When the relationship is shown as a tree-like state structure, that is defined as a tree-like developing hierarchical structure, the value of zero (0) given in the first coefficient of the tree-like developing factor means the composing polygon of a polyhedron which is equivalent to the basic shape as the mother structure of the curved surface, and it corresponds to the root of the tree-like state structure. The value 2 of the next stage means the 2nd branch, which develops from the root, and the value 3 of the next stage after the 2nd stage means the 3rd branch, which derives from the 2nd branch of the next stage after the 1st stage. The flowing values also construct the similar relationship.

Clearly, $4(a^4)$ which is an index of the largest coefficient of the tree-like developing factor shows the depth of the tree-like state structure.

Then, the case in which the chain-like developing factor J is 32 is calculated as same as an example of the above calculating operation. The constructive coefficient of dealing with the tree-like developing factor is required as the following arithmetic process:

Namely, $$
\begin{array}{r}
64(4^3) \,)\underline{\phantom{0}32\phantom{0}} \quad (0) \text{---} (a^3) \\
0 \\
16(4^2) \,)\underline{\phantom{0}32\phantom{0}} \quad (2) \text{---} (a^2) \\
32 \\
4(4^1) \,)\underline{\phantom{00}0\phantom{00}} \quad (0) \text{---} (a^1) \\
0 \\
1(4^0) \,)\underline{\phantom{00}0\phantom{00}} \quad (0) \text{---} (a^0) \\
\text{----} > (0, 2, 0, 0)
\end{array}
$$

The above arithmetic calculating process needs "exceptional handling".

As for the exceptional handling rule in the above calculating operation, when the degree of the tree-like developing factor is made to be a digit in the calculating operation, this arithmetic calculating process, which does not recognize zero (0) in the case of calculating the coefficient except the maximum order operand, namely, the largest digit, can be required, and naturally, the "canceling" operation of the digit becomes necessary.

This arithmetic calculating process with the digit canceling operation, in other words, the digit zero (0) canceling operation, is the calculating operation process which is treated as the value ( . . . , 0, 4, . . . ) by borrowing the value 4 from the calculating result of the front stage of the calculating stage which forms 0, for example, ( . . . , 1, 0, . . . ).

When the chain-like developing factor J is 32, the tree-like developing factor becomes (0, 2, 0, 0). Therefore, this digit canceling operation is treated by deducing the value (0, 1, 4, 0) from the high order digit (0, 2, 0, 0) of the tree-like developing factor. To determine the result of the above calculating operation, it is necessary to carry out the digit canceling operation again because zero (0) which is not permitted still exists. Namely, the digit canceling operation is carried out as value (0,1, 3, 4) from value (0, 1, 4, 0). The final result of this digit canceling arithmetic process becomes (0, 1, 3, 4).

Next, the case in which the chain-like developing factor J is 19 is calculated in such a manner that the calculating example is related above. The constructive coefficient equivalent to the tree-like developing factor is calculated by the following operation:

Namely, $$
\begin{array}{r}
64(4^3) \,)\underline{\phantom{0}19\phantom{0}} \quad (0) \text{---} (a^3) \\
0 \\
16(4^2) \,)\underline{\phantom{0}19\phantom{0}} \quad (1) \text{---} (a^2) \\
16 \\
4(4^1) \,)\underline{\phantom{00}3\phantom{00}} \quad (0) \text{---} (a^1) \\
0 \\
1(4^0) \,)\underline{\phantom{00}3\phantom{00}} \quad (3) \text{---} (a^0)
\end{array}
$$

-continued
$$\text{----} > (0, 1, 0, 3).$$

The tree-like developing factor becomes (0, 0, 4, 3) when the digit canceling operation is executed. Since only the coefficient of the head of the tree-like developing factor might permit the zero in this calculation, the higher order structure of digit (0, 0, . . . ) of the tree-like developing factor degenerates as a result, namely (0, . . . ). Therefore, the final result of the arithmetic calculating process becomes (0, 4, 3).

As the above result, it is shown in the generating process of the curved surface that this FACET is made up as the 4th forming FACET at the 1st generating stage. It is also shown in the 2nd generating stage that this FACET is made up as the 3rd forming FACET on the maternal surface of the 4th FACET. Namely, it is specified as a junction from the root (0) of the hierarchy to the 4th branch at the 1 st stage of the hierarchy and as a branch structure of the 3rd branch at the 2nd stage of this hierarchy.

Figure 6:
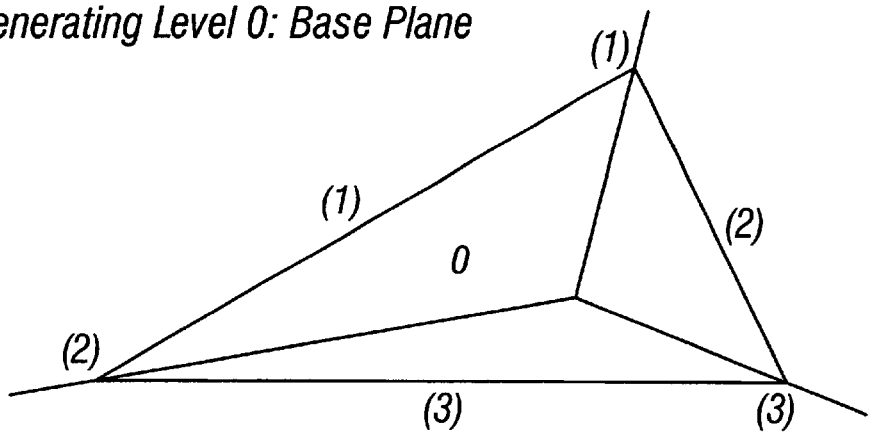
FIG. 6 shows an actual concave surface generating example in this embodiment.
Figure 6:
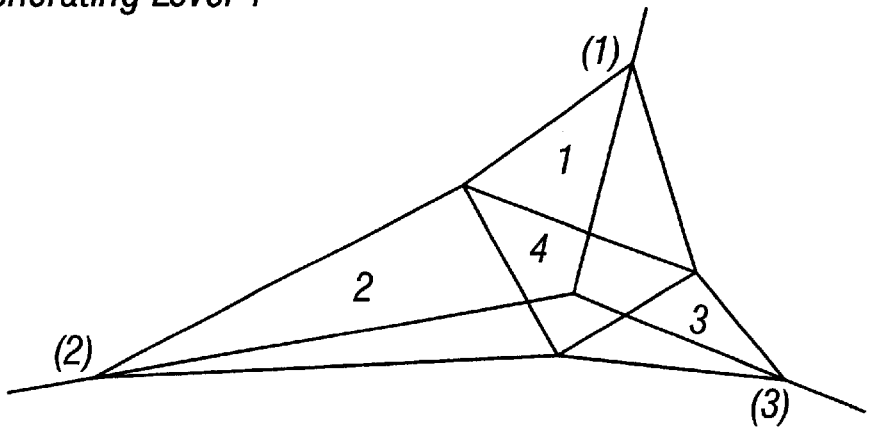
Figure 6:
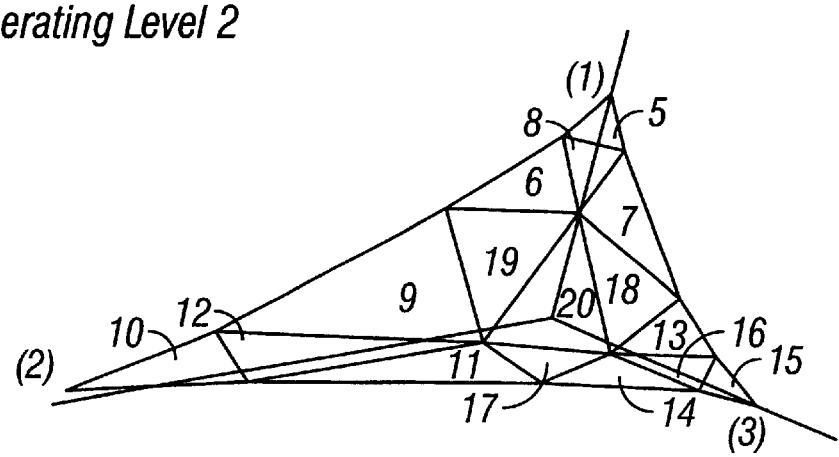

Clearly, the depth of the tree-like state structure becomes 2 if the shape generating level n is made to be 2. The generating relationship of the curved surface and the constituting formula of the curved surface structure are both shown in FIG. 6 as an example of a concave surface.

Next, the inverse calculating process of the above operation is carried out. If the tree-like developing factor $(a_n, a_{n-1}, \ldots, a_2, a_1, a_0)$ is given as the calculating condition because the inverse calculating operation method of the modified tetra decimal number system, that is the 4th modified power calculating method, is a commutative operation, the chain-like developing factor J is represented as a following equation;

$$a_n 4^n + a_{n-1} 4^{n-1} + \ldots + a_2 4^2 + a_1\, 4^1 + a_0 4^0 = J$$

wherein n is the depth of the tree-like state structure and the generating level of the curved surface. The calculating equation is the polynomial equation of the 4th power, and the coefficient of $a_n, a_{n-1}, \ldots, a_2, a_1$, and $a_0$ are respectively in the integer range from 1 to 4. Referring to the meaning described above, this arithmetic calculating system is distinguished from the general tetra decimal number system calculating operation method based on the calculating operation with the normal method of mod 4, and so it is called the modified tetra decimal number system calculating operation method.

The commutative operation, that is the inverse calculating operation, is carried out here as the modified 4th power calculating operation method. For this calculating operation example, $(a_4, a_3, a_2, a_1, a_0) = (0, 2, 3, 2, 3)$ in proportion to J=187 is carried out. Namely, the value J becomes the following result, $$J = 0 \times 4^4 + 2 \times 4^3 + 3 \times 4^2 + 2 \times 4^1 + 3 \times 4^0 = 187.$$

Clearly, this calculating operation retains the commutative structure.

Moreover, it is tried so as to also confirm that the commutative structure in this operation exists on the exceptional handling. In other words, $(a_2, a_1, a_0) = (0, 4, 3)$ in proportion to J=19 is carried out as the exceptional handling operation. Namely, the asking value J is:

$$J = 0 \times 4^2 + 4 \times 4^1 + 3 \times 4^0 = 19,$$

and the commutative structure is maintained even in the exceptional handling operation.

This method related to generating and/or displaying the shape of the curved surface, which puts the base for the modified method with the 4th power calculating operation, is the modified method for the tetra decimal number system (which corresponds to claim (6)).

By the modified method of the tetra decimal number system with the commutative calculating operation mechanism, both the tree-like state structure, that is the tree type of configuration structure, and the chain-like state structure, generally speaking the semi-linear alignment structure, that is the series type of configuration structure, are freely and easily constructed as a compatibility structure. As a result, the curved surface structure is embedded in the integrated and unique structure, and so the consistently and efficiently supporting system for the shape processing is constructed.

For example, the process in the generating shape and/or the displaying image on the complex body including the shape of the curved surface, etc. based upon the supporting system that is linked with brief and effective screen control devices like a mouse, etc. can be realized as the curved surface processing according to the simultaneous integrating structure.

Figure 7:
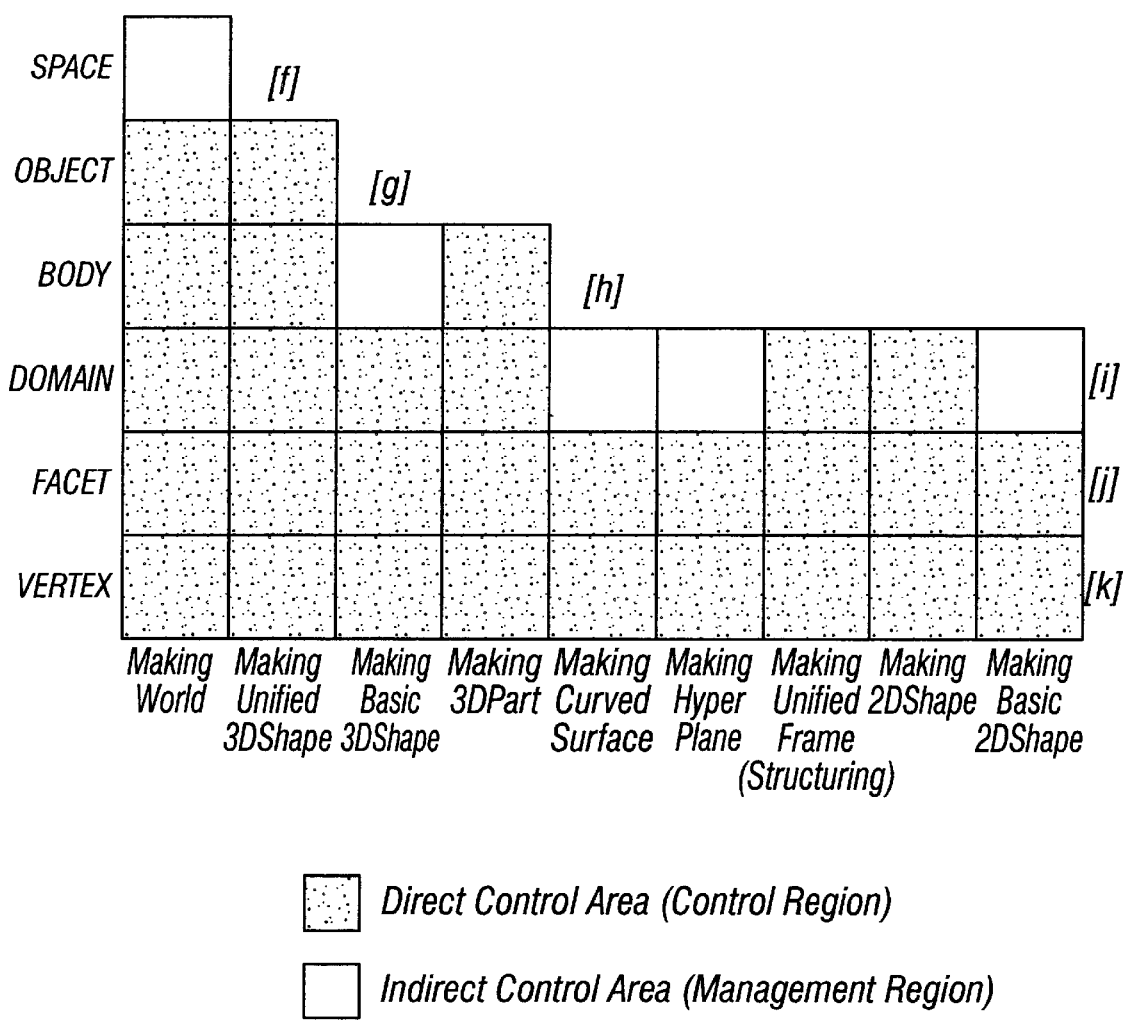
FIG. 7 is an example of a shape processing system constructed as one embodiment.
Figure 8:
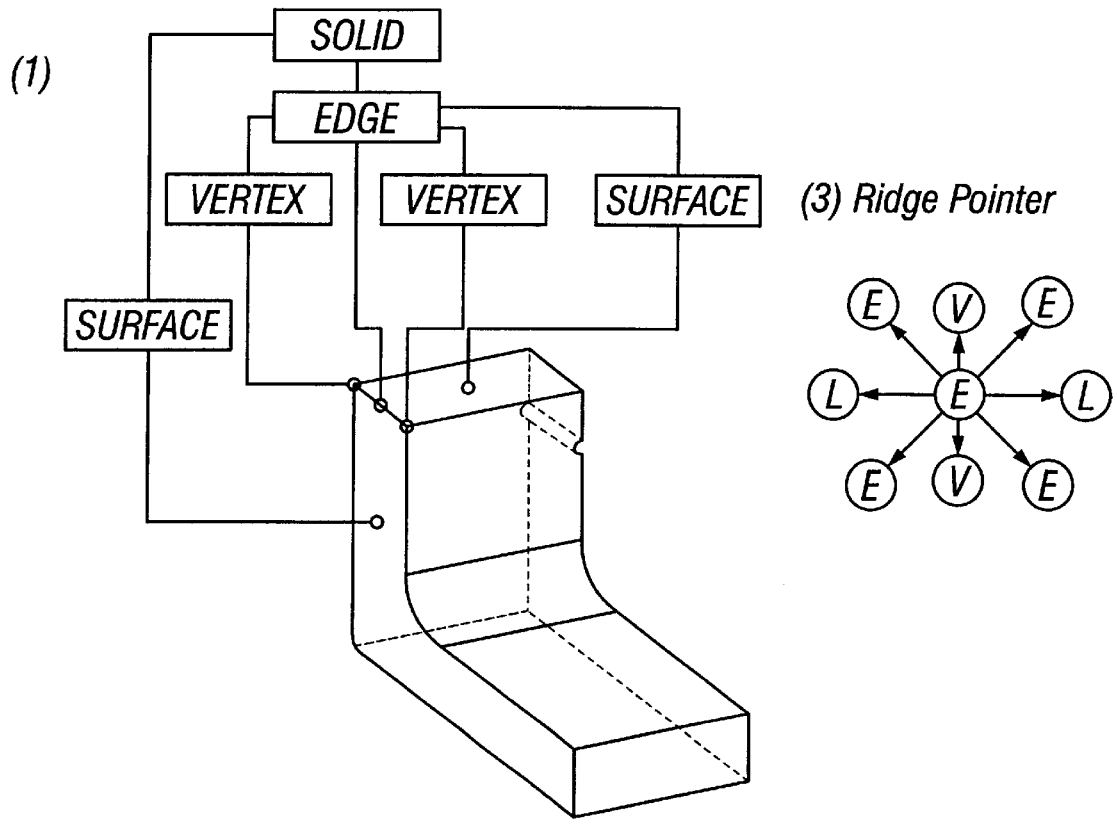
FIG. 8 shows a winged edge structure which is considered as a typical example of prior art supporting technology.
Figure 8:
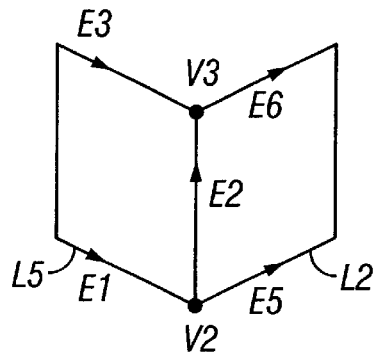
Figure 9:
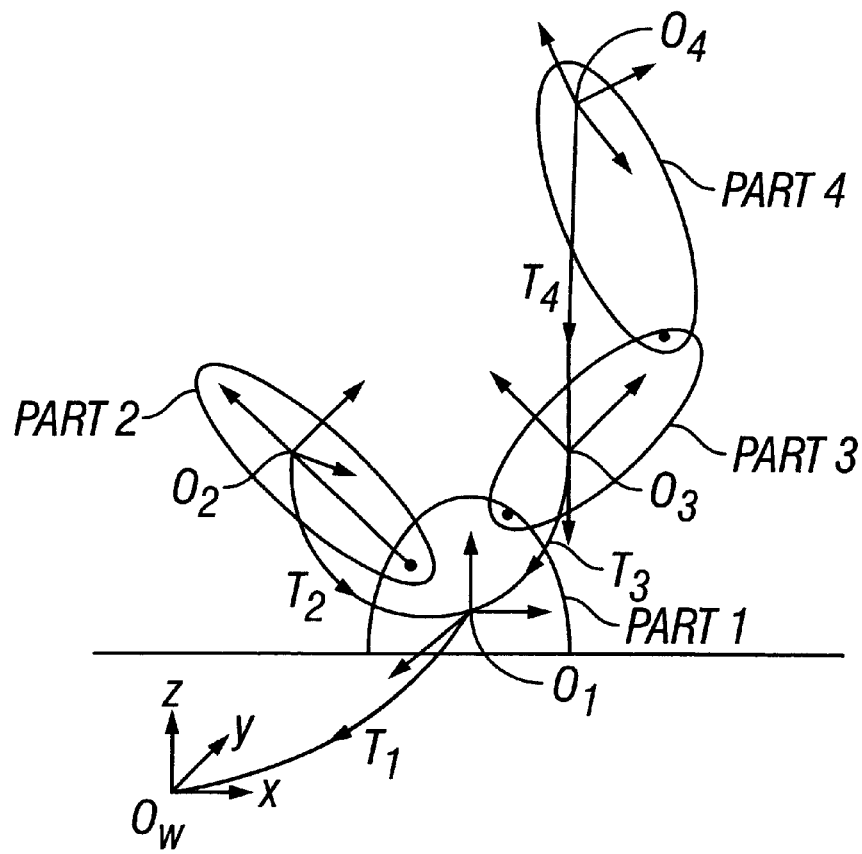
FIG. 9 shows a processing method of a coordinate relationship for the shape processing with an operational process used as another prior art example.

FIG. 7 shows one of embodiments of the supporting system for carrying out the generating and/or displaying process of the target shape. The supporting system as a prototype based on the outline of the structure shown here is constructed, and the smallest evaluation on the function of this system is carried out. As reasonable results, the evaluation is necessary and sufficient. However, the result should be repeatedly polished up, and the continual examination for the construction of the practical system is carried out in respect of the reevaluation.

In FIG. 7, the area with the oblique line is the area in which the substance process is carried out. In this case, the oblique line drawing part shown in FIG. 7 is constructed with the given control means as the function which enables the systematic control process. The part of the white omission in this Figure is the part which independently carries out the structuring management. By the constructing configuration of this system, the necessary controlling function is realized as the integrating and/or unifying process for the shape generating and/or displaying process.

The highest goal related to the shape processing is the generation of still picture images such as animation. In this case, the biggest target is the generation of the fusion image with the input video image or the generation of the 3D image for the constructing experiment of virtual reality.

Fundamentally, the programming for the construction of this system as a prototype is not based on pointers, and both the design and its mounting of the program by the dimensional arrangement are executed here.

For example, as shown in FIG. 7, in making index [k] of the arrangement to be a controlling element of the lowest structure and [f] of the arrangement to be made to function as a controlling element of the highest structure, the hierarchical structure for the shape generating and/or displaying process is constructed by the basic shape forming structure with the dependence to the above method.

Therefore, the structure for carrying out the fundamental management and control is constructed as the standard arrangement with the 6 index.

The above super-structure does not adopt the combinatory structure by using pointers, and constructs the tree-like state structure by the arrangement in proportion to the un ambiguity alignment structure placed in the series.

In other words, the characteristic method of the generating shape which expresses the general shape based on the polygon with the hyperplane is constructed as the mechanism which controls the hierarchical index of the arrangement given for the polygon by the polyhedron constructing method introduced here.

Based on this method, the supporting system of freely and easily combining the decomposing shape can be constructed in respect of the general shape. This system can easily realize the shape processing on the decomposition and/or combination of the shape, etc., because the procedure of the recursive organization is mounted in the inside of this system.

In the substructure constructed by corresponding with the curved surface processing, the fact related as above is realized effectively by an adjustable approach. According to the planar state shape structure, the curved surface can be created in the native shape, and the recursive structure can be also created as a result of the native property. The principle of the organization is the function which can be defined as self organization. In this case, the hierarchical structure to be accompanied is realized easily and unambiguously by features of the isomorphically forming FACET as an arrangement expression which corresponds to the chain-like state structure. As a commutative structure, the modified method of the tetra decimal number calculating operation system can convert the chain-like state structure according to the arrangement notation into the tree-like state structure. By the features of the isomorphic generating function, the tree-like state structure is also easily realized here as an arrangement expression.

Since the index of the arrangement works as a direct indicator, the arrangement expression is used instead of pointers. It is the role of the direct indicator that target index information with reference to such a polygon shape can be immediately specified from this kind of configuration information when direct configuration information about the polygon of the target shape, for example, a shape composing point is given as the location of the sequence which is designated by the index, The above described function can be also realized when a pointer is used, but a double calculating process is fundamentally required. Thinking well about this meaning, a pointer should be called an indirect indicator from a kind of function.

Therefore, the pointer is an indirect indicator. Namely, the function of the direct indicator by using pointers cannot be expected in the standard procedure except for the object oriented procedure.

When the function of such a direct indicator described as above is jointly used along with a pointing function of an operation mechanism such as a mouse, some operations on the coordinate transformation, etc. can be freely and easily realized in a display screen.

In this prototype, the mechanism for simply realizing the 3D shape state processing based on the exchanging mechanism over the 2D display screen is mounted. At first, the hierarchical structure by the expression of the arrangement is constructed as a man-machine interface; and next, the pointing mechanism on the display screen based on the constructed structure for the transformation using the mouse is constructed. In other words, the above mechanism is mounted in the supporting system related to the shape generating and/or displaying process shown in FIG. 7. Because of the method described above, the 3D shape state processing by the brief and explicit operation can be efficiently realized.

For example, the shape generating and/or displaying technology shown in the above embodiment contributes to the reduction of the data volume on constructing the database of shapes and pictures, and the technology for offering the efficient utilization environment can be obtained in the management of the information access, etc.

Moreover, such a technology as described above becomes the brief and effective supporting technology for the construction and/or management of the system. A brief and effective database can be offered for the image generating environment such as the retaining of the compatibility with the existing database, for example. Thus, this kind of technology can offer a very big impact.

In addition, this technology also becomes an effective multimedia environment supporting technology that constructs and controls efficiently and easily the multimedia environment. For example, even under the lower cost condition, the shape processing in the complex and/or advanced communication environment and the image database necessary therefor, etc. can be constructed as a database of higher processing efficiency.

Therefore, the above embodiments can sufficiently work in the next stage of CAD and/or CAM and/or CAE which perfectly integrates the prior CAD/CAM and CAE. Naturally, the technology as a nucleus of the supporting technology should propose a multimedia CAD, realizing the new species of CAD in proportion to the multimedia environment. Therefore, the technology positioned as a realizing technology for the system which exceeds CALS can be also propose an innovative production system thereof, etc.

The environment of multimedia CAD can be defined here as a system environment based on the cooperative multiple hierarchical design. In this design activity, the producer and customer should need and seek the construction of the sharing, expanded, and unified internal environment for the aiming direction.

The mechanism which realizes the above system must require such a mechanism as enables the furnished coordinate design.

Namely, such a system is realized in the way of the organizing and/or structuring technology which constructs such a mechanism as the image database for the advanced shape processing in the bi-directional communication environment. In this meaning, the technology shown in the above embodiments is the technology that can comply therewith. According to the above technology, not only it is positioned as the technology naturally changing the mass production method of CIM, thus realizing multi-kind and/or small-quantity production system at the aim of CALS, but also it is positioned as the technology which supports the conversion into the ordered system in a style of the gentle production system for the natural environment.

The technology of the present invention easily realizes a coordinate design and/or production in the game producing environment as well as CAD, which is similar to a composition of drama that is done by a series of producing and/or guidance seen in the production of movies and plays. The game production is done in a similar way such as a drama in which a producer performs producing and progress of the drama.

In other words, it is possible that a game producer carries out the supervision and/or production of a game in proportion to the principal object of the whole composition in connected screen information. For example, manufacturers of an individual game character who carry out the game generating process try and seek to become the same as a stage actor, considering the intention of the producing person.

The construction of such a game generating environment can be realized by means of the present invention.

In addition, like the play world which can unite the stage with the observer's seat by way of a bi-directional environment, the rebuilding game execution environment according to the game composing environment and the advanced bi-directional game in which a customer can put himself in the world of games simultaneously and freely can be also offered.

Consequently, an advanced multimedia realizing environment can be constructed, and the subject and the object are fused together in cyber space as the integrated world. It can be embodied in a multimedia world as the internal environment which includes the so-called virtual reality feeling obtained without directly experiencing it. Since the method of the above embodiments can expand this species of the world more and more, the present invention can be expected to be a tool that enables effective communication.

What is claimed is:

1. A shape generating or shape displaying method comprising:

a step of setting a basic shape forming set, that is a fundamental unit structure, which accomplishes a systematic organization so as to unitarily carry out a generating or displaying process of a target shape, and developing a data of the basic shape forming set in a memory, and then supplying them to an arithmetic unit;

a step of setting an upper side management or control structure which is for sequentially constructing a superstructure of a hierarchical structure by way of recursively repeating a substructure from a basic shape forming set of assembling information to a higher rank of hierarchy, systematically linking data of said upper side management or control structure to data of said basic shape forming set and developing as a group of a 1st table in the memory, and then supplying them to said arithmetic unit;

a step of setting an under side management or control structure which is for sequentially constructing a last-structure of a hierarchical structure by way of recursively repeating a substructure from a basic shape forming set of geometric information to a lower rank of hierarchy, systematically linking data of said under side management or control structure to data of said basic shape forming set, and developing as a group of a 2nd table in the memory, and then supplying them to said arithmetic unit; and a step of carrying out a dynamic management or control by way of using the arithmetic unit based on acquiring data of upper and lower management or control structures, which determines a structural relationship and is located in said basic shape forming set, from said groups of said 1st table and said 2nd table as connecting information that has a systematically linked unitary hierarchical structure;

thus performing a unitary shape processing.

2. A shape generating or shape displaying method according to claim 1, wherein:

said step of setting the upper side management or control structure in which, as operational information which determines an operation for locating an operation oriented shape which constructs the target shape in space, not merely data of configuration information which comprises a movement amount showing a positioning relationship and a rotational amount showing an azimuth relationship but also data of connecting information which shows a hierarchical configuration relationship or adjacency configuration relationship of said operation oriented shape are related so as to form a parallel standing combinatory set as assembling information which flexibly manages or controls a shape handing process by using a combinatory relationship between a direct control of a spatial arrangement of the operation oriented shape and an indirect control according to a hierarchical construction relationship of the operation oriented shape, and are developed as the group of said 1st table, and then are served to the arithmetic unit; and said step of carrying out the dynamic management or control includes:

a step which recursively constructs said substructure that matches the operation oriented shape for constructing a group of assembling information as controlling information for forming the operation oriented shape from said data of the basic shape forming set, and develops the group of assembling information in memory, and serves them in the arithmetic unit; and a step which controls composing information so as to solve or connect the operation oriented shape, thus changing the target shape.

3. A shape generating or shape display method according to claim 2, wherein said step of carrying out the dynamic management or control comprises:

a step of constructing a tree-like forming structure, that is a tree-like developing hierarchical structure of the target shape, by controlling configuration information or connecting information; and a step of managing or controlling the shape handling process by selectively controlling and by dynamically developing a tree-like developing standard point which matches a forming level of the operation oriented shape in said tree-like forming structure;

thus perform a data management that matches the operation oriented shape.

4. A shape generating or shape displaying method according to claim 1, wherein:

said step of setting the upper side management or control structure includes a step which sets a mutual linkage configuration factor which complements a connecting relationship of said upper side management or control structure and then develops the mutual lineage configuration factor in the group of said 1st table; and said step of carrying out the dynamic management or control includes a step which constructs a management mechanism for shape handling process, which is a complementary mechanism of said upper side management or control structure, by way of controlling said mutual linkage configuration factor which is unitarily organized; and wherein management of historical information of an assembly of the target shape is cared out on the upper side management or control structure according to a shape management data obtained from a parallel processing of a management mechanism.

5. A shape generating or shape displaying method according to claim 1, wherein:

said step of constructing the basic shape forming set includes a step which sets up geometric information by a combinatory set based on coordinates of composing points of the target shape and azimuth vector of a triangular plane, that is a shape forming unit of the target shape, and develops geometric information in said memory, and then serves it in the arithmetic unit;

said step of setting the upper side management or control structure includes a step which sets up a connecting relationship of said shape forming unit, and develops data of said shape forming units in the group of 1st table one after another;

said step of setting the under side management or control structure includes a step which constructs a group of said geometric information so as to develop structural data of a curved surface in the group of 2nd table one after another by recursively embedding information of the curved structure in said basic shape forming set according to the shape forming unit; and said step of carrying out dynamic management or control includes a step of managing or controlling by means of recursive organization based on composing information of the modified 4th power calculating operation method as a tree-like forming structure or chain-like forming structure, thus hierarchically managing or controlling said target shape.

6. A shape generating or shape displaying method according to claim 5, wherein said step of setting the under side management or control structure comprises:

a step which performs, in order to construct said hierarchical structure, a structural transform by obtaining a tree-like developing factor $(a_n, a_{n-1}, \ldots, a_2, a_1, a_0)$ from a chained developing factor J with a modified tetra number system calculating operation method, using the following calculating equation:

$$J \text{ div\_mod}(4^n) = (a_n, a_{n-1}, \ldots, a_2, a_1, a_0)$$

wherein, div_mod is a synthesis operator of a division and residual operator, that is an operator which deter quotient and remainder simultaneously, and in said calculation an asked quotient is given in coefficient of dealing with tree-like developing factor, and then a remainder becomes an operand of a next stage in said operation, and moreover, in said calculation, it is forbidden that zero (0) values are taken except for a head coefficient $a^n$ of the tree-like developing factor, and when 0 is formed, a "canceling" operation is carried out by borrowing 1 from a result of previous calculation to make 4; and a step which deter the chain-like developing factor from said tree-like developing factor by using the following calculating equation:

$$a_n 4^n + a_{n-1} 4^{n-1} + \ldots + a_2 4^2 + a_1 4^1 + a_0 4^0 = J$$

wherein, n is a depth of the tree-like forming structure and is a generating level of the curved surface, and each coefficient of polynomial $a_n, a_{n-1}, a_2, a_1$, and $a_0$ is respectively in integer range from 1 to 4, namely a stage of structure change based on said calculating operation method;

thus construing the chain-like forming structure or tree-like forming structure as a commutative structure, and managing or controlling the curved surface.

7. A computer-readable medium recorded with a program for a shape generating or displaying which carries out a unitary shape handling process by way of functionally operating a computer so as to execute:

a step of setting a basic shape forming set, that is a fundamental unit structure, which accomplishes a systematic organization so as to unitarily carry out a generating or display process of a target shape, and developing a data of the basic shape fog set in a memory, and then supplying them to an arithmetic unit;

a step of setting an upper side management or control structure which is for sequentially constructing a superstructure of a hierarchical structure by way of recursively repeating a substructure from a basic she forming set of assembling information to a higher rank of hierarchy, systematically linking data of said upper side management or control structure to data of said basic se forming set, and developing as a group of 1st table in the memory, and then supplying them to said arithmetic unit;

a step of setting an under side management or control structure which is for sequentially constructing a laststructure of a hierarchical structure by way of recursively repeating a substructure from a basic shape forming set of geometric information to a lower rank of hierarchy, systematically linking data of said under side management or control structure to data of said basic shape forming set, and developing as a group of 2nd table in the memory, and then supplying them to said arithmetic unit; and a step of carrying out a dynamic management or control by way of using the arithmetic unit based on acquiring data of upper and lower management or control structures, which determines a structural relationship and is located in said basic shape forming set, from said groups of said 1st table and said 2nd table as connecting information th has a systematically linked unitary hierarchical structure.

8. A computer-readable medium recorded with a program for a shape generating or displaying according to claim 7, wherein said program carries out a variable shape handling process by way of functionally operating a computer so as to execute:

said step of setting the upper side management or control structure in which, as operational information which determines an operation for locating an operation oriented shape which constructs the target shape in space, not merely data of configuration information which comprises a movement amount showing a positioning relationship and a rotational amount showing an azimuth relationship but also data of connecting information which shows a hierarchical configuration relationship or adjacency configuration relationship of said operation oriented shape are related so as to form a parallel standing combinatory set as assembling information which flexibly manages or controls a shape handling process by using a combinatory relationship between a direct control of a spatial arrangement of the operation oriented shape and an indirect control according to a hierarchical construction on relationship of the operation oriented shape, and are developed as the group of said 1st table, and then are served to the arithmetic unit; and said step of carrying out the dynamic management or control includes:

a step which recursively constructs said substructure that matches the operation oriented shape for constricting a group of assembling information as controlling information for forming the operation oriented shape from said data of the basic shape forming set, and develops the group of assembling information in memory, and serves them in the arithmetic unit; and a step which controls composing information so as to solve or connect the operation oriented shape, thus changing the target shape.

9. A computer-readable medium recorded with a program for a shape generating or displaying according to claim 8, wherein said program carries out a data management that matches the operation oriented shape by way of functionally operating a computer so as to execute said step of carrying out the dynamic management or control that comprises:

a step of constructing a tree-like forming structure, that is a tree-like developing hierarchical structure of the target shape, by controlling configuration information or connecting information; and a step of managing or controlling the shape handling process by selectively controlling and by dynamically developing a tree-like developing standard point which matches a forming level of the operation oriented shape in said tree-like forming structure.

10. A computer-readable medium recorded with a program for a shape generating or displaying according to claim 7, wherein said program carries out, on the upper side management or control structure, a management of historical information of an assembling of the target shape, according to shape management data obtained from a parallel processing of a management Mechanism by way of functionally operating a computer so as to execute:

said step of setting the upper side management or control structure includes a step which sets a mutual linkage configuration factor which complements a connecting relationship of said upper side management or control structure and then develops the mutual linkage configuration factor in the group of 1st table; and said step of carrying out the dynamic management or control includes a step which constructs a management mechanism for shape handling process, which is a complementary mechanism of said upper side management or control structure, by way of controlling said mutual linkage configuration factor which is unitarily organized.

11. A computer-readable medium recorded with a program for a shape generating or displaying according to claim 7, wherein said program carries out a hierarchical managing or controlling of a target shape by way of functionally operating a computer so as to execute:

said step of constructing the basic shape forming set includes a step which sets up geometric information by a combinatory set based on coordinates of composing points of the target shape and azimuth vector of a triangular plane, that is a shape forming unit of the target shape, and develops geometric information in said memory, and then serves it in the arithmetic unit;

said step of setting the upper side management or control structure includes a step which sets up a connecting relationship of said shape forming unit, and develops data of said shape firming units in the group of said 1st table one after another;

said step of setting the under side management or control strove includes a step which constructs a group of said geometric information so as to develop structural data of a curved surface in the group of said 2nd table one after another by recursively embedding information of the curved structure in said basic shape forming set according to the shape forming unit; and said step of carrying out dynamic management or control includes a step of managing or controlling by means of recursive organization based on composing information of the modified 4th power calculating operation method as a tree-like forming structure or chain-like forming structure.

12. A computer-readable medium recorded with a program for a shape generating or displaying display according to claim 11, wherein said program carries out a construction of the chain-like forming structure or tree-like forming structure as a commutative structure and a managing or controlling of a curved surface, by way of functionally operating a computer so as to execute:

said step of setting the under side management or control structure that includes:

a step which performs, in order to construct said hierarchical structure, a structural transform by obtain a tree-like developing factor $(a_n, a_{n-1}, \ldots, a_2, a_1, a_0)$ from a chained developing factor J with a modified tetra number by calculating operation method, using the following calculating equation:

$$J \text{ div\_mod}(4^n) = (a_n, a_{n-1}, \ldots, a_2, a_1, a_0)$$

wherein, div_mod is a synthesis operator of a division and residual operator, that is an operator which determines quotient and remainder simultaneously, and in said calculation an asked quotient is given in coefficient of dealing with tree-like developing factor, and then a remainder becomes an operand of a next stage in said operation, and moreover, in said calculation, it is forbidden that zero (0) values are taken except for a head coefficient $a^n$ of the tree-like developing factor, and when 0 is formed, a "canceling" operation is carried out by borrowing 1 from a result of previous calculation to make 4; and a step which determines the chain-like developing factor from said tree-like developing factor by using the following calculating equation:

$$a_n 4^n + a_{n-1} 4^{n-1} + \ldots + a_2 4^2 + a_1 4^1 + a_0 4^0 = J$$

wherein, n is a depth of the tree-like forming structure and is a generating level of the curved surface, and each coefficient of polynomial $a_n$, $a_{n-1}$, $a_2$, $a_1$ and $a_0$ is respectively in integer range from 1 to 4, namely a stage of structural change based on said calculating operation method.

* * * * *